US010614928B2

(12) United States Patent
Hansen-Estruch

(10) Patent No.: US 10,614,928 B2
(45) Date of Patent: Apr. 7, 2020

(54) BIODEGRADABLE FLEXIBLE LIGHTWEIGHT ENERGY STORAGE COMPOSITE AND METHODS OF MAKING THE SAME

(71) Applicant: Philippe Hansen-Estruch, San Diego, CA (US)

(72) Inventor: Philippe Hansen-Estruch, San Diego, CA (US)

(*) Notice: Subject to any disclaimer, the term of this patent is extended or adjusted under 35 U.S.C. 154(b) by 0 days.

(21) Appl. No.: 15/955,594

(22) Filed: Apr. 17, 2018

(65) Prior Publication Data

US 2018/0301236 A1    Oct. 18, 2018

Related U.S. Application Data

(60) Provisional application No. 62/486,420, filed on Apr. 17, 2017.

(51) Int. Cl.
| | | |
|---|---|---|
| *H01B 1/12* | (2006.01) | |
| *C08K 5/053* | (2006.01) | |
| *C08L 41/00* | (2006.01) | |
| *C08J 3/075* | (2006.01) | |
| *C08L 1/02* | (2006.01) | |
| *C08L 65/00* | (2006.01) | |
| *C08J 5/04* | (2006.01) | |
| *C08L 25/18* | (2006.01) | |

(52) U.S. Cl.
CPC .............. *H01B 1/128* (2013.01); *C08J 3/075* (2013.01); *C08J 5/045* (2013.01); *C08K 5/053* (2013.01); *C08L 1/02* (2013.01); *C08L 41/00* (2013.01); *C08L 65/00* (2013.01); *C08G 2261/1424* (2013.01); *C08G 2261/3223* (2013.01); *C08G 2261/512* (2013.01); *C08J 2341/00* (2013.01); *C08J 2365/00* (2013.01); *C08J 2381/04* (2013.01); *C08L 25/18* (2013.01); *C08L 2201/54* (2013.01); *C08L 2203/204* (2013.01)

(58) Field of Classification Search
CPC ........ H01G 11/56; H01G 9/025; H01G 11/48; H01G 9/028; H01G 9/15; H01G 9/042; H01G 9/0036; H01G 9/0425; H01G 9/045; H01G 11/02; H01G 11/58; H01G 11/62; H01G 9/00; H01G 9/035; H01G 9/038; H01G 9/048; H01G 9/055; H01G 9/06; H01G 9/145; H01G 9/151; H01G 11/30; H01G 9/155; H01L 51/0037; H01L 51/4253; H01L 51/441; H01M 10/052; H01M 10/0566; H01M 10/0567; H01M 4/137; H01M 4/60; H01M 4/602; H01M 6/162; H01M 6/166; C08K 5/053; C08L 1/02; C08L 25/18; C08L 65/00; C08L 2201/54; C08L 2203/204; C08L 41/00; C08G 2261/1424; C08G 2261/3223; C08G 2261/512; C08J 2341/00; C08J 2365/00; C08J 2381/04; C08J 3/075; C08J 5/045; H01B 1/128
See application file for complete search history.

(56) References Cited

U.S. PATENT DOCUMENTS

| | | | | |
|---|---|---|---|---|
| 5,173,214 A | * | 12/1992 | Kissel | C08J 3/215 252/519.2 |
| 2005/0048228 A1 | * | 3/2005 | Anderson | H01L 51/0015 428/32.11 |
| 2006/0057451 A1 | * | 3/2006 | Okuzaki | C08J 3/075 524/379 |
| 2006/0102869 A1 | | 5/2006 | Cavaille et al. | |
| 2006/0148844 A1 | * | 7/2006 | Nakade | A61K 31/437 514/303 |
| 2012/0043530 A1 | * | 2/2012 | Badre | H01B 1/122 257/40 |
| 2013/0089769 A1 | * | 4/2013 | Proctor | H01G 11/42 429/127 |
| 2015/0279503 A1 | | 10/2015 | Scheel et al. | |
| 2016/0079612 A1 | | 3/2016 | Kim et al. | |
| 2017/0204241 A1 | * | 7/2017 | Nicolay | H01M 4/485 |
| 2018/0047988 A1 | * | 2/2018 | Seuring | H01M 4/62 |
| 2018/0241081 A1 | * | 8/2018 | Deng | H01M 10/0565 |

FOREIGN PATENT DOCUMENTS

| | | | | |
|---|---|---|---|---|
| EP | 1324124 A1 * | 7/2003 | | B41M 5/44 |
| EP | 2 587 564 A1 | 5/2013 | | |
| EP | 2 800 102 A1 | 11/2014 | | |
| EP | 3 118 613 A1 | 1/2017 | | |
| WO | WO 2009/069086 A2 | 6/2009 | | |
| WO | WO 2010/005377 A1 | 1/2010 | | |
| WO | WO 2010/022353 A1 | 2/2010 | | |
| WO | WO 2011/144292 A2 | 11/2011 | | |
| WO | WO 2013/060409 A1 | 5/2013 | | |

(Continued)

OTHER PUBLICATIONS

Aliahmad, N. et al., "Paper-Based Lithium-Ion Batteries Using Carbon Nanotube-Coated Wood Microfibers," IEEE Transactions on Nanotechnology, 2013, 12 (3), 408-412.
Bhattacharya, R. et al., "Rechargeable Electronic Textile Battery," Applied Physics Letters, 2009, 95, 223305, 4 pages, doi: 10.1063/1.3269907.
Hu, L. et al., "Highly Conductive Paper for Energy-Storage Devices," Proceedings of the National Academy of Sciences, 2009, 106 (51), 21490-21494.
Huang, J. et al., "Achieving Efficient Poly(3,4-ethylenedioxythiophene)-based Supercapacitors by Controlling the Polymerization Kinetics," Electrochimica Acta, 2011, 56, 7228-7234.
Irimia-Vladu, M. et al., "Green and Biodegradable Electronics," Materials Today, 2012, 15 (7-8), 340-346.

(Continued)

*Primary Examiner* — Mark Kopec
*Assistant Examiner* — Jaison P Thomas
(74) *Attorney, Agent, or Firm* — Hoxie & Associates LLC

(57) ABSTRACT

Provided are biodegradable, flexible, lightweight composites with efficient energy storage and methods for producing the same. Said composites comprise a conductive polymer, a secondary dopant, and a structural component.

27 Claims, No Drawings

(56) References Cited

FOREIGN PATENT DOCUMENTS

WO  WO 2015/067339 A1  5/2015
WO  WO 2016/142850 A1  9/2016

OTHER PUBLICATIONS

Kawahara, J. et al., "Reconfigurable Sticker Label Electronics Manufactured from Nanofibrillated Cellulose-Based Self-Adhesive Organic Electronic Materials," Organic Electronics, 2013, 14, 3061-3069.
Kim, G-H. et al., "Engineered Doping of Organic Semiconductors for Enhanced Thermoelectric Efficiency," Nature Materials, 2013, 12, 719-723.
Kurra, N. et al., "A Conducting Polymer Nucleation Scheme for Efficient Solid-State Supercapacitors on Paper," Journal of Materials Chemistry A, 2014, 2, 17058-17065.
Lay, M. et al., "Strong and Electrically Conductive Nanopaper from Cellulose Nanofibers and Polypyrrole," Carbohydrate Polymers, 2016, 152, 361-369.
Lay, M. et al., "Smart Nanopaper Based on Cellulose Nanofibers with Hybrid PEDOT:PSS/Polypyrrole for Energy Storage Devices," Carbohydrate Polymers, 2017, 165, 86-95.
Lay, M. et al., "High Electrical and Electrochemical Properties in Bacterial Cellulose/Polypyrrole Membranes," European Polymer Journal, 2017, 91, 1-9.
Lee, Y-Y. et al., "Growth Mechanism of Strain-Dependent Morphological Change in PEDOT:PSS Films," Scientific Reports—Nature, 2016, 6:25332, 9 pages, doi: 10.1038/srep25332.
Lin, Y. et al., "Recent Advancements in Functionalized Paper-Based Electronics," Applied Materials & Interfaces, 2016, 8, 20501-20515.
Liu, Y. et al., "High-Performance Flexible All-Solid-State Supercapacitor from Large Free-Standing Graphene-PEDOT/PSS Films," Scientific Reports—Nature, 2015, 5:17045, 11 pages, doi: 10.1038/srep17045.
Malti, A. et al., "An Organic Mixed Ion-Electron Conductor for Power Electronics," Advanced Science, 2016, 3, 1500305, 9 pages, doi: 10.1002/advs.201500305.
Malti, A. et al., "Supplementary Information for an Organic Mixed Ion-Electron Conductor for Power Electronics," 29 pages, retrieved on Apr. 3, 2018, from: https://onlinelibrary.wiley.com/action/downloadSupplement?doi=10.1002%2Fadvs.201500305&file=advs86-sup-0001-S1.pdf.
Missoum, K. et al., "Nanofibrillated Cellulose Surface Modification: A Review," Materials, 2013, 6, 1745-1766.
Mostafalu, P. et al., "Paper-based Super-capacitor Using Micro and Nano Particle Deposition for Paper-based Diagnostics," Sensors, 2013 IEEE, 4 pages.
Nuramdhani, I. et al., "Electrochemical Impedance Analysis of a PEDOT:PSS-Based Textile Energy Storage Device," Materials, 2018, 11, 48, 11 pages, doi: 10.3390/ma11010048.
Nyholm, L. et al., "Toward Flexible Polymer and Paper-Based Energy Storage Devices," Advanced Materials, 2011, 23, 3751-3769.
Odhiambo, S. et al., "Reliability Testing of PEDOT:PSS Capacitors Integrated into Textile Fabrics," Eksploatacja I Niezawodnosc—Maintenance and Reliability, 2014, 16 (3), 447-451.
Ouyang, J. et al., "On the Mechanism of Conductivity Enhancement in Poly(3,4-ethylenedioxythiophene):poly(styrene sulfonate) Film Through Solvent Treatment," Polymer, 2004, 45, 8443-8450.
Proctor, C. et al., "Understanding Volumetric Capacitance in Conducting Polymers," Journal of Polymer Science, Part B: Polymer Physics, 2016, 54, 1433-1436.
Rivnay, J. et al., "Structural Control of Mixed Ionic and Electronic Transport in Conducting Polymers," Nature Communications, 2016, 7:11287, 9 pages, doi: 10.1038/ncomms11287.
Shqau, K. et al., "Mixed Ionic Electronic Conductors for Improved Charge Transport in Electrotherapeutic Devices," Proceedings of the 2017 Design of Medical Devices Conference, copyright 2017, 2 pages, retrieved on Apr. 2, 2018, from: http://proceedings.asmedigitalcollection.asme.org/.
Shukur, M.F. et al., "Electrical Characterization of Corn Starch-LiOAc Electrolytes and Application in Electrochemical Double Layer Capacitor," Electrochimica Acta, 2014, 136, 204-216.
Stöcker, T. et al., "Why Does the Electrical Conductivity in PEDOT:PSS Decrease with PSS Content? A Study Combining Thermoelectric Measurements with Impedance Spectroscopy," Journal of Polymer Science, 2012, 50, 976-983.
Ummartyotin, S. et al., "Deposition of PEDOT:PSS Nanoparticles as a Conductive Microlayer Anode in OLEDs Device by Desktop Inkjet Printer," Journal of Nanomaterials, vol. 2011, Article ID 606714, 7 pages, doi: 10.1155/2011/606714.
Valtakari, D. et al., "Conductivity of PEDOT:PSS on Spin-Coated and Drop Case Nanofibrillar Cellulose Thin Films," Nanoscale Research Letters, 2015, 10:386, 10 pages, doi: 10.1186/s11671-015-1093-y.
Volkov, A. et al., "Understanding the Capacitance of PEDOT:PSS," Advanced Functional Materials, 2017, 27, 1700329, 10 pages, doi: 10.1002/adfm.201700329.
Wang, X. et al., "Layer-by-Layer Assembled Hybrid Multilayer Thin Film Electrodes Based on Transparent Cellulose Nanofibers Paper for Flexible Supercapacitors Applications," Journal of Power Sources, 2014, 249, 148-155.
Wang, Z. et al., "Cellulose-based Supercapacitors: Material and Performance Considerations," Advanced Energy Materials, 2017, 7, 1700130, 22 pages, doi: 10.1002/aenm.201700130.
Wei, Q. et al., "Recent Progress on PEDOT-Based Thermoelectric Materials," Materials, 2015, 8, 732-750.
Zang, J. et al., "Stretchable and High-Performance Supercapacitors with Crumpled Graphene Papers," Scientific Reports—Nature, 2014, 4:6492, 7 pages, doi: 10.1038/srep06492.
Zeng, H. et al., "Interfacial Layer Engineering for Performance Enhancement in Polymer Solar Cells," Polymers, 2015, 7, 333-372.
Zhao, D. et al., "Highly Flexible and Conductive Cellulose-Mediated PEDOT:PSS/MWCNT Composite Films for Supercapacitor Electrodes," Applied Materials & Interfaces, 2017, 9, 13213-13222.
Zhu, H. et al., "Biodegradable Transparent Substrates for Flexible Organic-Light-Emitting Diodes," Energy & Environmental Science, 2013, 6, 2105-2111.
Hansen-Estruch, P., "Design of Biodegradable Energy Source to Power Wearable Electronics," poster presented at Greater San Diego Science & Engineering Fair, Mar. 16-17, 2017, 15 pages.

\* cited by examiner

BIODEGRADABLE FLEXIBLE LIGHTWEIGHT ENERGY STORAGE COMPOSITE AND METHODS OF MAKING THE SAME

This application claims priority to U.S. Provisional Application No. 62/486,420 filed Apr. 17, 2017, which is incorporated herein by reference in its entirety.

FIELD OF THE INVENTION

The invention relates generally to the fields of novel energy storage composites, and more specifically to energy storage composites comprising biodegradable/renewable, flexible, and lightweight materials.

BACKGROUND OF THE INVENTION

I. Energy Storage

There is an increasing demand for wearable/portable electronics leading to an increased need for suitable electrical storage devices to power them. For this application, the ideal energy storage device would be safe, biodegradable and flexible with a high capacity and a discharge at a high rate to support peak consumption. Electrical storage can take place in batteries or capacitors. For batteries, electric energy is stored through chemical redox reactions in accordance with long-term small current discharge. In general, batteries provide higher energy power for storage but they are temperature sensitive and have limited cycle life and long charging time. Furthermore, batteries are unsafe because they contain flammable electrolyte(s) and are pressurized. This is particularly concerning when considering "wearable" applications as battery materials are brittle and rigid. For capacitors, electric energy is stored through physical charge accumulation. Capacitors typically contain low toxicity materials and no corrosive electrolytes and they have a long cycle life, a greater power density than batteries with rapid charge and discharge capabilities operating in a wide temperature range. Because of these properties, capacitors have applications in multiple fields such as energy storage, digital memory, power conditioning, suppression and coupling, motor starter, sensing, and the like. However, capacitors present some limitations such as low energy density (low amount of energy storage) that need to be addressed. Additional limitations stem from the fact that materials and processes utilized to generate a capacitor with improved performance typically result in bulky, large size, and heavy weight capacitors.

Therefore, there is a need for an energy storage composite for efficient energy storage. Furthermore, composites prepared with mechanically flexible, lightweight and biodegradable/renewable materials are desirable.

II. Conductive Polymers:

Conductive polymers are the basis of organic electronics or polymer electronics as opposed to electronics based on inorganic conductors and semiconductors such as copper and silicon. Conductive polymers induce conductivity as a result of the formation of charge carriers upon oxidation or reduction of their conjugated backbone. Simply put, conductive polymers are kind of glue that holds electrode materials together while shuttling electrons within and between the intra-molecular chains. Some of the attractive properties useful in a sustainable process of conductive polymers are their biodegradability, low volatility, low toxicity, and thermal stability. Furthermore, conductive polymers may be somewhat flexible as they can be deposited on flexible materials/substrates such as plastic and more recently paper and textiles.

Major drawbacks of conductive polymers include their lack of stability in their conductive state leading to a relatively low working voltage and their structural limitations. Additional disadvantages are low capacitance, strength, tensility, porosity, surface area, and rate capability. Some improvement of a few of these properties have been achieved thus far for limited applications by using complex processes including hazardous substrates such as carbon nanotubes and graphene oxide.

III. PEDOT:PSS:

Amongst various organic materials used for organic electronics is a conductive polymer PEDOT:PSS (poly(3,4-ethylenedioxythiophene)-poly(styrenesulfonate)). PEDOT:PSS consists of two oppositely charged polymers: poly(3,4-ethylenedioxythiophene) (PEDOT) that is positively charged whereas poly(styrenesulfonate) (PSS) is negatively charged. Together, PEDOT:PSS makes a macromolecular salt available as aqueous dispersions that can reach high conductive values up to 1000 Siemens/cm. PSS acts as a polyanionic to neutralize the highly oxidized PEDOT chains. The PEDOT molecule can lose one or more electrons whereas the PSS receives them.

PEDOT:PSS belongs to the class of mixed ionic-electronic conductors (MIECs) that have significant conduction both ionically and electronically. MIECS are able to capacitate rapid solid state reactions and are widely used in devices for energy conversion and storage. Under an externally applied electrical field, the charged PEDOT and PSS polymer chains will move in opposite directions so that the material will be electrically polarized and the capacitor becomes charged. After removal of the applied electrical field the ions will move back to their original position so that the material loses its polarisation.

As such, PEDOT:PSS exhibits some of the desired properties to design a novel energy storage that would be lightweight, flexible, and renewable. However, PEDOT:PSS presents numerous key limitations such as poor mechanical stability (i.e. cracks and discontinuities), limited capacitance, and relatively low charge/discharge. Strategies implemented to attempt to enhance conductive polymers' properties designed for various applications such as electroluminescent devices, solar cells, and electrode materials include the use of secondary dopants and the coating or printing of the conductive polymers on paper or on fabric to generate a conductive composite film. Drawbacks of existing composites and methods are that these composite films are typically prepared at high temperature and intermixed with hazardous chemicals such as copper, indium oxide, and graphene oxide and intermixed with complex structures such as nanowires, nanoparticles, and carbon nanotubes, using complex protocols involving multiple steps such as spin coating, layer-by-layer deposit, printing, etching, spray film formation, and patterning of complex interdigitated structures of different thin film materials inside a bulk volume with a high surface area or by including a carbon or copper foam. These methods also include the formation of a thin film with loss of capacitance as the film thickness increases, thus becoming unsuitable for most electronics applications. Furthermore, under certain circumstances, readily flammable or toxic solvents must also be employed.

Thus, there is a need for a simple method to create such an energy storage composite using safe and biodegradable materials that are conceivably available in large quantities.

IV. Glucose Polymers as Structural Materials:

Cellulose is one of the most abundant polymers produced naturally by numerous organisms including trees, algae, bacteria, and fungi. Cellulose is a linear polymer structured as a fibrous network. There are two major building blocks that can be derived from cellulose: regular fiber with micrometer size diameter and nanocellulose fibers with nanometer size diameter. Cotton fibers almost entirely consist of cellulose whereas wood contains almost 50% cellulose.

Cellulose consists of glucose units with hydrogen bonding between the hydrogen of hydroxyl groups and oxygen holds the cellulose fiber tightly together designed to maximize the stability and durability of plants. This property allows for the formation of large porosity that in turn allows for fast access of ionic species to the electrode surfaces. As such, it can support the redox chemistry. The three-dimensional hierarchical structures formed by cellulose fibers combined with the capability of incorporating the functionality of other materials, make cellulose an interesting material for applications in electrical and electrochemical devices. Cellulose in the form of paper has been used as material as the basis for the production of simple integrated electric and/or electronic circuits. Conductive components can be, for instance, deposited by means of ink-jet printing on the surface of paper. This method of printing minimizes penetration of the conductive polymer and prevents its further deep penetration into the fiber. Therefore, the use of cellulose in the form of paper may not be the optimal form to fully take advantage of the beneficial structural properties that cellulose may offer.

Starch is a polymeric carbohydrate consisting of the same glucose-based repeat units than cellulose but with different groups. It can be derived from potatoes, wheat, corn, rice, cassava, etc. Starch is one of the most commonly used biopolymers in industries because of nontoxicity, biodegradability, biocompatibility, low cost, and being renewable and abundantly available in nature. Similar to cellulose, it can support redox chemistry and can thus be a candidate to improve the structural deficiencies of conductive polymers.

V. Secondary Dopants:

In an effort to improve conductive polymers' properties, secondary dopants may be applied in the form of a liquid and/or vapor to conductive polymers already doped with a primary dopant. Secondary dopants induce significant changes in molecular conformation and dependent properties such as solution viscosity, Vis-UV spectra, crystallinity, dielectric constant, conductivity/temperature relationship, and the like. These effects may persist after complete removal of the secondary dopant. For instance, the conductive polymer PEDOT:PSS has been reported to form entangled structures with the primary dopant PSS. The degree of disorder, or amorphous phase, may vary from 10% to 100% and the phase separation has been reported to proportionally affect the properties of the conductive polymer. The phase separation state can be controlled in some instances by addition of "secondary dopants" that can facilitate inter-molecular charge transfer.

Secondary dopants such as polyols (e.g. glycerol), polyethers (e.g. polyethylene glycol (PEG)), solvents (e.g., organosulfur solvents such as dimethylsulfoxide (DMSO)) have been utilized with the goal of increasing conductivity and plasticity of conductive polymers. For instance, glycerol is known to improve plasticity and water absorption allowing for ion movement. However, incorporation of secondary dopants has to be judiciously designed (e.g. ratio, sequence of addition into the mixture, etc.) as it may result in significant and detrimental alterations of the properties of conductive polymers such as reduction of tensility, embrittlement, scission, phase separation, etc., of the resulting material.

VI. Need for Flexible, Lightweight, Biodegradable Energy Storage

The availability of a composite that is biodegradable, flexible, lightweight while generating higher performance differentials would represent a major advance in the field of electronics in general, and the field of wearable and embeddable devices in particular. Hence, there is still a need to develop an energy storage composite that may partially or wholly be made of renewable and/or biodegradable material. The present invention satisfies these needs and provides related advantages as well.

Although the polymers and the components described here offer partial and limited advantages when considered separately, the outcome of their combination to achieve the structural and functional properties necessary to yield a type of energy storage composites described in the present invention, remains unanticipated. Indeed, only some of the combinations described in the present invention resulted in superior composites whereas some combinations reported here resulted in non-functional and/or structurally challenged mixes with no clear applications.

The present invention provides the combinations of conductive polymers which have been enhanced with specific secondary dopants and polymeric structural materials that have surprisingly yielded the desirable properties. Ideally, the components used for the preparation of an energy storage composite would be flexible, lightweight, biodegradable and/or renewable, available in large quantities, and would be easily processed. Furthermore, their combination would give rise to an efficient composite with desirable energy storage properties and that favors long term stability and minimize device failure.

DETAILED DESCRIPTION OF THE INVENTION

The following description is of the best-contemplated mode of carrying out the invention. This description is made for the purpose of illustrating the general principles of the invention and should not be taken in a limiting sense.

I. Introduction

The development of energy storage poses a challenge particularly for wearable electronics devices. For example, for wearable electronics device, energy storage composites are made of hazardous materials such as lithium and they are typically made of rigid materials. There is thus a need for biodegradable, flexible, lightweight composites generating higher performance differentials.

II. Definitions

As used herein, the following terms have the meanings ascribed to them unless specified otherwise.

The term "polymers", as used herein, includes all compounds with more than one identical or different repeating unit.

As used herein, "conjugated polymer" or "conductive polymer" refers to organic polymers having alternating single and double bonds along the polymer backbone and which have an electrical conductivity after oxidation or reduction.

The "conductive polymer" employed in the materials and composites according to the invention, is any conductive polymer known in the art. Typically, the conductive polymer employed is selected to comprise at least one moiety permitting charge transfer between the components of the composition. In some embodiments, the conductive polymers are selected amongst polymers comprising an atom such as O, N, and S or a moiety comprising such an atom. In some embodiments, the conductive polymer is selected from polythiophene, polypyrrole, and polyaniline.

Without wishing to be bound by theory, the association between at least one conductive polymer and at least one (i.e. one or more) primary dopant in a composite according to the invention, results from an acid-base interaction, causing association, via chemical bond (e.g., ionic or coordinative bond) between the two moieties. This association results in a charge carrier transfer between the polymer and the primary dopant.

As used herein, the following list is provided for the purpose of examples and should not be regarded as exclusive. Examples of conductive polymers include Polypyrrole (PPy), Polyaniline (PANT), Poly(3,4-ethylenedioxythiophene) (PEDT, PEDOT), Polythiophene (PTh), Polythiophene-vinylene (PTh-V), Poly(2,5-thienylenevinylene) (PTV), Poly(3-alkylthiophene) (PAT), Poly(p-phenylene) (PPP), Poly-p-phenylene-sulphide (PPS), Poly(p-phenylenevinylene) (PPV), Poly(p-phenylene-terephthalamide) (PPTA), Polyacetylene (PAc), Poly(isothianaphthene) (PITN), Poly(α-naphthylamine) (PNA), Polyazulene (PAZ), Polyfuran (PFu), Polyisoprene (PIP), Polybutadiene (PBD), Poly(3-octylthiophene-co-3-methylthiophene) (POTMT), Poly(p-phenylene-terephthalamide) (PPTA), and the like.

The term "doping", or "dopant", or any lingual variation thereof, denotes the introduction of structures into the conductive polymer material for the purpose of altering the polymer's electronic/electric/structural properties.

As used herein, a "primary dopant" refers to a component that can modify the structure of the conductive polymer backbone and/or side chain. When doped, the conductivity of the conjugated polymer/conductive polymer can increase by several orders of magnitude.

As used herein, a "secondary dopant" refers to a component that can modify the structure of a conductive polymer that may be doped with a primary dopant. The secondary dopant can provide improved properties to the resulting composite.

As used herein, a "structural component" refers to a component that can form a network-like tertiary structure. For example, structural component may include cellulose polymers and the likes.

As used herein, a "composite" material refers to materials made from two or more constituent materials or components with different physical and/or chemical properties. When combined, a material with different characteristics from the individual components is produced. The individual components can remain separate and distinct in the composite. The composite can include a matrix material in which are embedded other components that form the composite.

As used herein, "dispersion" or "slurry" or "suspension" refers to a system where particles (e.g., polymer particles) are dispersed in a continuous phase of a different composition (e.g., a liquid medium, such as a solvent).

As used herein, "gel" refers to a three-dimensional polymeric network that can span the volume of a liquid or semi-solid or solid medium and can ensnare it through surface tension effects. The polymer's internal network structure can result from physical bonds or chemical bonds, as well as crystallites or other junctions that remain intact within the liquid or semi-solid or solid medium.

As used herein, "colloid" is a stable system of at least two phases, one of which is dispersed in the other in the form of very small droplets or particles or suspension. For instance, a hydrogel is a colloid gel in which water is the continuous phase.

Particle size measurements may be made by, for example, laser diffraction and by other techniques known to those skilled in the art.

III. Description of the Embodiments

Reference will now be made in detail to embodiments, examples of which are illustrated in the accompanying description. In this regard, the present embodiments may have different forms and should not be construed as being limited to the descriptions set forth herein. Accordingly, the embodiments are merely described below to explain aspects of the present description. As used herein, the term "and/or" includes any and all combinations of one or more of the associated listed items. Expressions such as "at least one of," when preceding a list of elements, modify the entire list of elements and do not modify the individual elements of the list. Hereinafter, composite for an energy storage composite according to embodiments of the present disclosure are described in detail below.

Thus, in one aspect the composite of the invention comprises a conductive material comprising at least one conductive polymer doped with at least one secondary dopant.

A composite according to an embodiment of the present invention may include at least one conductive polymer, a secondary dopant, and a structural component.

The conductive polymer in the composite preferably contains at least one polythiophene. The polythiophenes used in the present invention can be neutral or cationic. In preferred embodiments, they are cationic, wherein "cationic" relates only to the charges provided on the main polythiophene chain. The cationic polythiophenes require anions as counterions. The counterions can be monomeric or polymeric anions, the latter are also referred to below as polyanions. Polymeric anions here can be, for example, anions of polymeric sulfonic acids, such as poly(styrenesulfonate) (PSS).

The polymer anion(s) and the polythiophene making the conjugated polymers contained in the dispersion preferably lies in a range of from 0.1 to 20% by weight, particularly preferably in a range of from 0.5 to 10% by weight and most particularly preferably in a range of from 1 to 5% by weight.

In certain embodiment, the conductive polymer may be at least one selected from the class of PEDOT:PSS.

In certain embodiments, the secondary dopant may be at least one selected from the class of polyol such as glycerol.

In certain embodiments, the structural component may be at least one selected from the class of cellulose.

In certain embodiments, an average size of the structural component may be in a range of about 1 nm to about 500,000 nm. For example, an average size may be in a range of 1 nm to 100 nm. For example, an average size may be in a range of about 1000 nm to about 500,000 nm. In another aspect of the invention, the structural component is a fiber. In yet another aspect of the invention, the fiber is a cotton fiber.

In a related aspect, regarding a mixed ratio of a conductive polymer, a secondary dopant, and a structural component, based on percentage volume per volume (v/v %), a range of 0.1 to 10 v/v % of a conductive polymer, a range of 1 to 20 v/v % of a secondary dopant, and a range of 0.1 to 5 v/v % of a structural component may be utilized. In certain embodiments, an amount of 0.7 v/v % of a conductive polymer, an amount of 12.5 v/v % of a secondary dopant, and an amount of 0.7 v/v % of a structural component may be utilized. In yet another embodiment, an amount of 0.7 v/v % of the conductive polymer PEDOT:PSS, an amount of 12.5 v/v % of the secondary dopant glycerol, and of 0.7 v/v % of the structural component cellulose may be utilized.

In certain embodiments, the composite may be prepared by mixing components using mixing methods known in the art. The components may be wet blended in the presence of a suitable solvent or dry blended using a mortar or other conventionally known mixing equipment. The preparation may include pre-heating of at least one component prior to the mixing with other components. The pre-heating step may be performed at temperatures for which the components remain structurally efficacious. In certain embodiments, the pre-heating temperature ranges from 45° C. to 50° C. In yet another embodiment, the mixture is cast. In certain instances, the mixture is dried at a temperature which is sufficiently high to remove or to decrease the concentration of at least one component but which does not deteriorate the composite. In certain embodiments, the drying temperature ranges from 45° C. to 50° C. Composite preparation conditions may be appropriately fine-tuned by one of ordinary skill in the art.

The composites obtained according to the present invention can be in the form of a gel, layer, waffle, and the like.

Compared to a paper for energy storage, a gel for energy storage as described herein may be more easily spread and provide an air seal and better contact with other layers.

Any of a variety of techniques known in the art can be used to characterize one or more properties of a composite of the present invention. Examples of characterization include evaluation of electrochemical properties such as capacitance, conductivity, resistance, impedance, resistivity, charge time, cycle life, voltage, specific energy, specific power, charge temperature, residual current, breakdown voltage, and discharge temperature. Physical properties of a composite may be assessed such as appearance, thickness, composition, and viscosity. Further examples of characterization include mechanical properties that may be assessed by tests including tensile tests, trouser tear tests, bending tests, and scanned electron microscope.

A contribution towards the use of a composite of the present invention is achieved by an energy storage device which has been manufactured using a composite of the invention.

In certain embodiments, a composite of the present invention may be encased in a system by one of ordinary skill in the art thereby completing the manufacture of an energy storage device. In certain embodiments, a plurality of composites may be stacked to create a composite assembly and may be encased in a system by one of ordinary skill in the art thereby completing the manufacture of an energy storage device.

In yet another embodiment, the layers of composite assembly may be separated with a component such as cellulose or cellulose embedded in an acetate-based solution, and the like, creating an energy storage system.

In certain embodiments, the composite assembly may be used in various devices that require high capacitance and high power output. In a further aspect, the energy storage device is a capacitor. For example, the capacitor may be used in a pacemaker, a sensor, or the like.

In certain embodiments, a positive electrode and a negative electrode may be added to form a battery assembly. In certain embodiments, a plurality of battery assemblies may be stacked in a bi-cell structure. In yet another embodiment, the bi-cell structure may be impregnated with a solution and/or separated with a layer of a composite and/or a filter impregnated with a solution such as an acetate-based solution, and the obtained result may be housed in a pouch, followed by sealing, thereby making a battery.

In certain embodiments, a plurality of the battery assemblies may be stacked to form a battery pack, and the battery pack may be used in various devices that require high power output. For example, the battery assemblies may be used in a computer, a smartphone, an electric vehicle, or the like.

Accordingly, provided is a composite for energy storage (Composite 1), wherein the composite comprises:
  a. a conductive material, wherein the conductive material comprises a conductive polymer doped with a primary dopant;
  b. a secondary dopant; and
  c. a structural component,
wherein the conductive material, secondary dopant, and structural component form a gel.

Further provided is Composite 1 as follows:
  1.1 Composite 1, wherein the conductive polymer comprises one or more of O, N, and S (in addition to C).
  1.2 Composite 1 or 1.1, wherein the conductive polymer is one or more of polypyrrole (PPy), polyaniline (PANI), poly(3,4-ethylenedioxythiophene) (PEDT, PEDOT), polythiophene (PTh), polythiophene-vinylene (PTh-V), poly(2,5-thienylenevinylene) (PTV), poly(3-alkylthiophene) (PAT, P3AT), poly(p-phenylene) (PPP), poly-p-phenylene-sulphide (PPS), poly (p-phenylene vinylene) (PPV), poly(p-phenylene terephthalamide) (PPTA), polyacetylene (PAc), poly (isothianaphthene) (PITN), poly($\alpha$-naphthylamine) (PNA), polyazulene (PAz), polyfuran (PFu), polyisoprene (PIP), polybutadiene (PBD), poly(3-octylthiophene-co-3-methylthiophene) (POTMT), and poly(p-phenylene-terephthalamide) (PPTA).
  1.3 Any of Composite 1, 1.1, or 1.2, wherein the conductive polymer is cationic.
  1.4 Any of Composite 1, 1.1, or 1.2, wherein the conductive polymer is neutral.
  1.5 Any of Composite 1 or 1.1-1.4, wherein the conductive polymer is a polythiophene.
  1.6 Any of Composite 1 or 1.1-1.5, wherein the conductive polymer is poly(3,4-ethylenedioxythiophene).
  1.7 Any of Composite 1 or 1.1-1.6, wherein the composite comprises 0.01 to 20% w/w of the conductive polymer, e.g., 0.01 to 10% w/w, e.g., 0.01 to 5% w/w, e.g., 0.01 to 1% w/w, or, e.g., 0.1 to 20% w/w, e.g., 0.1 to 10% w/w, e.g., 0.5 to 10% w/w, e.g., 1 to 5% w/w.
  1.8 Any of Composite 1 or 1.1-1.7, wherein the composite comprises 0.01 to 1% w/w of the conductive polymer, e.g., 0.01 to 0.5% w/w, e.g., 0.01 to 0.2% w/w, e.g., 0.01 to 0.1% w/w, or, e.g., 0.1 to 1% w/w, e.g., 0.5% w/w.
  1.9 Any of Composite 1 or 1.1-1.8, wherein the primary dopant is anionic, e.g., wherein the primary dopant is polyanionic.
  1.10 Any of Composite 1 or 1.1-1.9, wherein the primary dopant is poly(styrenesulfonate), e.g., wherein the conductive polymer doped with the primary dopant is poly(3,4-ethylenedioxythiophene)-poly(styrenesulfonate) (PEDOT:PSS).

1.11 Any of Composite 1 or 1.1-1.10, wherein the composite comprises 0.01 to 20% w/w of the primary dopant, e.g., 0.01 to 10% w/w, e.g., 0.01 to 5% w/w, e.g., 0.01 to 1% w/w, or, e.g., 0.1 to 20% w/w, e.g., 0.1 to 10% w/w, e.g., 0.5 to 10% w/w, e.g., 1 to 5% w/w.

1.12 Any of Composite 1 or 1.1-1.11, wherein the composite comprises 0.01 to 1% w/w of the primary dopant, e.g., 0.01 to 0.5% w/w, e.g., 0.01 to 0.2% w/w, e.g., 0.01 to 0.1% w/w, or, e.g., 0.1 to 1% w/w, e.g., 0.8% w/w.

1.13 Any of Composite 1 or 1.1-1.12, wherein the composite comprises 0.01 to 20% w/w of the conductive polymer and primary dopant, e.g., 0.01 to 10% w/w, e.g., 0.01 to 5% w/w, e.g., 0.01 to 1% w/w, or, e.g., 0.1 to 20% w/w, e.g., 0.1 to 10% w/w, e.g., 0.5 to 10% w/w, e.g., 0.5 to 5% w/w, e.g., 1 to 5% w/w.

1.14 Any of Composite 1 or 1.1-1.13, wherein the composite comprises 0.01 to 1% w/w of the conductive polymer and primary dopant, e.g., 0.01 to 0.5% w/w, e.g., 0.01 to 0.2% w/w, e.g., 0.1 to 0.2% w/w, or, e.g., 0.5 to 2% w/w, e.g., 1 to 2% w/w.

1.15 Any of Composite 1 or 1.1-1.14, wherein the composite comprises 0.1 to 20% by weight of the polyanionic primary dopant (e.g., poly(styrenesulfonate)) and polythiophene (e.g., poly(3,4-ethylenedioxythiophene)) e.g., 0.5 to 10% by weight, e.g., 1 to 5% by weight.

1.16 Any of Composite 1 or 1.1-1.15, wherein the structural component comprises fibers.

1.17 Composite 1.16, wherein the fibers are cotton fibers.

1.18 Any of Composite 1 or 1.1-1.17, wherein the structural component is a glucose polymer.

1.19 Any of Composite 1 or 1.1-1.18, wherein the structural component is cellulose (e.g., cellulose from cotton).

1.20 Any of Composite 1 or 1.1-1.18, wherein the structural component is starch (e.g., corn starch).

1.21 Any of Composite 1 or 1.1-1.20, wherein the average particle size of the structural component is in the range of about 1 nm to about 500,000 nm, e.g., 1 nm to 100 nm, or, e.g., about 1000 nm to about 500,000 nm or, e.g., 5-10 microns, or, e.g., 20 microns, or e.g., 50 microns.

1.22 Any of Composite 1 or 1.1-1.20, wherein the cellulose fibers have micrometer size diameter.

1.23 Any of Composite 1 or 1.1-1.22, wherein the composite comprises 0.1 to 20% w/w of the structural component (e.g., cellulose), e.g., 1 to 20% w/w, e.g., 5 to 20% w/w, e.g., 5 to 15% w/w, or, e.g., 0.1 to 5% w/w, e.g., 0.1 to 1% w/w.

1.24 Any of Composite 1 or 1.1-1.23, wherein the secondary dopant is a polyol.

1.25 Any of Composite 1 or 1.1-1.24, wherein the secondary dopant is glycerol.

1.26 Any of Composite 1 or 1.1-1.25, wherein the composite comprises 1 to 30 v/v % of the secondary dopant, e.g., 1 to 20 v/v %, e.g., 5 to 20 v/v %, e.g., 10 to 20 v/v %, e.g., 10 to 15 v/v %.

1.27 Any of Composite 1 or 1.1-1.26, wherein the composite comprises 1 to 30% w/w of the secondary dopant, e.g., 5 to 30% w/w, e.g., 10 to 20% w/w, e.g., 15 to 20% w/w.

1.28 Any of Composite 1 or 1.1-1.27, wherein the composite comprises 0.1 to 10 v/v % of the conductive polymer and primary dopant, 0.1 to 5 v/v % of the structural component, and 1 to 20 v/v % of the secondary dopant.

1.29 Any of Composite 1 or 1.1-1.28, wherein the composite comprises 0.7 v/v % of the conductive polymer and primary dopant, 0.7 v/v % of the structural component, and 12.5 v/v % of the secondary dopant, e.g. 0.7 v/v % PEDOT:PSS, 0.7 v/v % cellulose, and 12.5 v/v % glycerol.

1.30 Any of Composite 1 or 1.1-1.29, wherein the composite is as described in any of the examples below.

1.31 Any of Composite 1 or 1.1-1.30, wherein under an externally applied electrical field the conductive polymer and primary dopant move in opposite directions so that the composite will be electrically polarized and become charged.

Further provided is a composite made as described in any of the examples below.

Further provided is an energy storage device (Device 1), wherein the energy storage device comprises any of Composite 1 or 1.1-1.31.

Further provided is Device 1 as follows:

1.1 Device 1, wherein the device is a capacitor.

1.2 Device 1 or 1.1, wherein the device further comprises a positive electrode and a negative electrode.

1.3 Any of Device 1, 1.1, or 1.2, wherein a plurality of composites is stacked to form a composite assembly.

1.4 Device 1.3, wherein the layers of the composite assembly are separated, e.g., with cellulose or cellulose embedded in an acetate-based solution.

1.5 Any of Device 1 or 1.1-4, wherein the device is used in a pacemaker, a sensor, a battery pack, a computer, a smartphone, or an electric vehicle.

Further provided is an energy storage device made as described in any of the examples below.

Further provided is a method (Method 1) of making a composite for energy storage (e.g., any of Composite 1 or 1.1-1.31), wherein the method comprises admixing a conductive material comprising a conductive polymer doped with a primary dopant, a secondary dopant, and a structural component to form the composite, wherein the composite is a gel.

Further provided is Method 1 as follows:

1.1 Method 1, wherein the conductive polymer comprises one or more of O, N, and S (in addition to C).

1.2 Method 1 or 1.1, wherein the conductive polymer is one or more of polypyrrole (PPy), polyaniline (PANT), poly(3,4-ethylenedioxythiophene) (PEDT, PEDOT), polythiophene (PTh), polythiophene-vinylene (PTh-V), poly(2,5-thienylenevinylene) (PTV), poly(3-alkylthiophene) (PAT, P3AT), poly(p-phenylene) (PPP), poly-p-phenylene-sulphide (PPS), poly(p-phenylene vinylene) (PPV), poly(p-phenylene terephthalamide) (PPTA), polyacetylene (PAc), poly(isothianaphthene) (PITH), poly(α-naphthylamine) (PNA), polyazulene (PAz), polyfuran (PFu), polyisoprene (PIP), polybutadiene (PBD), poly(3-octylthiophene-co-3-methylthiophene) (POTMT), and poly(p-phenylene-terephthalamide) (PPTA).

1.3 Any of Method 1, 1.1, or 1.2, wherein the conductive polymer is cationic.

1.4 Any of Method 1, 1.1, or 1.2, wherein the conductive polymer is neutral.

1.5 Any of Method 1 or 1.1-1.4, wherein the conductive polymer is a polythiophene.

1.6 Any of Method 1 or 1.1-1.5, wherein the conductive polymer is poly(3,4-ethylenedioxythiophene).

1.7 Any of Method 1 or 1.1-1.6, wherein the method comprises admixing 0.01 to 20% w/w of the conductive polymer, e.g., 0.01 to 10% w/w, e.g., 0.01 to 5% w/w, e.g., 0.01 to 1% w/w, or, e.g., 0.1 to 20% w/w, e.g., 0.1 to 10% w/w, e.g., 0.5 to 10% w/w, e.g., 1 to 5% w/w.

1.8 Any of Method 1 or 1.1-1.7, wherein the method comprises admixing 0.01 to 1% w/w of the conductive polymer, e.g., 0.01 to 0.5% w/w, e.g., 0.01 to 0.2% w/w, e.g., 0.01 to 0.1% w/w, or, e.g., 0.1 to 1% w/w, e.g., 0.5% w/w.

1.9 Any of Method 1 or 1.1-1.8, wherein the primary dopant is anionic, e.g., wherein the primary dopant is polyanionic.

1.10 Any of Method 1 or 1.1-1.9, wherein the primary dopant is poly(styrenesulfonate), e.g., wherein the conductive polymer doped with the primary dopant is poly(3,4-ethylenedioxythiophene)-poly(styrenesulfonate) (PEDOT:PSS).

1.11 Any of Method 1 or 1.1-1.10, wherein the method comprises admixing 0.01 to 20% w/w of the primary dopant, e.g., 0.01 to 10% w/w, e.g., 0.01 to 5% w/w, e.g., 0.01 to 1% w/w, or, e.g., 0.1 to 20% w/w, e.g., 0.1 to 10% w/w, e.g., 0.5 to 10% w/w, e.g., 1 to 5% w/w.

1.12 Any of Method 1 or 1.1-1.11, wherein the method comprises admixing 0.01 to 1% w/w of the primary dopant, e.g., 0.01 to 0.5% w/w, e.g., 0.01 to 0.2% w/w, e.g., 0.01 to 0.1% w/w, or, e.g., 0.1 to 1% w/w, e.g., 0.8% w/w.

1.13 Any of Method 1 or 1.1-1.12, wherein the method comprises admixing 0.01 to 20% w/w of the conductive polymer and primary dopant, e.g., 0.01 to 10% w/w, e.g., 0.01 to 5% w/w, e.g., 0.01 to 1% w/w, or, e.g., 0.1 to 20% w/w, e.g., 0.1 to 10% w/w, e.g., 0.5 to 10% w/w, e.g., 0.5 to 5% w/w, e.g., 1 to 5% w/w.

1.14 Any of Method 1 or 1.1-1.13, wherein the method comprises admixing 0.01 to 1% w/w of the conductive polymer and primary dopant, e.g., 0.01 to 0.5% w/w, e.g., 0.01 to 0.2% w/w, e.g., 0.1 to 0.2% w/w, or, e.g., 0.5 to 2% w/w, e.g., 1 to 2% w/w.

1.15 Any of Method 1 or 1.1-1.14, wherein the method comprises admixing 0.1 to 20% by weight of the polyanionic primary dopant (e.g., poly(styrenesulfonate)) and polythiophene (e.g., poly(3,4-ethylenedioxythiophene)) e.g., 0.5 to 10% by weight, e.g., 1 to 5% by weight.

1.16 Any of Method 1 or 1.1-1.15, wherein the method comprises admixing the conductive polymer and primary dopant prior to admixing with the structural component.

1.17 Any of Method 1 or 1.1-1.16, wherein the structural component comprises fibers.

1.18 Method 1.17, wherein the fibers are cotton fibers.

1.19 Any of Method 1 or 1.1-1.18, wherein the structural component is a glucose polymer.

1.20 Any of Method 1 or 1.1-1.19, wherein the structural component is cellulose (e.g., cellulose from cotton).

1.21 Any of Method 1 or 1.1-1.19, wherein the structural component is starch (e.g., corn starch).

1.22 Any of Method 1 or 1.1-1.21, wherein the average particle size of the structural component is in the range of about 1 nm to about 500,000 nm, e.g., 1 nm to 100 nm, or, e.g., about 1000 nm to about 500,000 nm or, e.g., 5-10 microns, or, e.g., 20 microns, or e.g., 50 microns.

1.23 Any of Method 1 or 1.1-1.21, wherein the cellulose fibers have micrometer size diameter.

1.24 Any of Method 1 or 1.1-1.23, wherein the method comprises admixing 0.1 to 20% w/w of the structural component (e.g., cellulose), e.g., 1 to 20% w/w, e.g., 5 to 20% w/w, e.g., 5 to 15% w/w, or, e.g., 0.1 to 5% w/w, e.g., 0.1 to 1% w/w.

1.25 Any of Method 1 or 1.1-1.24, wherein the secondary dopant is a polyol.

1.26 Any of Method 1 or 1.1-1.25, wherein the secondary dopant is glycerol.

1.27 Any of Method 1 or 1.1-1.26, wherein the method comprises admixing 1 to 30 v/v % of the secondary dopant, e.g., 1 to 20 v/v %, e.g., 5 to 20 v/v %, e.g., 10 to 20 v/v %, e.g., 10 to 15 v/v %.

1.28 Any of Method 1 or 1.1-1.27, wherein the method comprises admixing 1 to 30% w/w of the secondary dopant, e.g., 5 to 30% w/w, e.g., 10 to 20% w/w, e.g., 15 to 20% w/w.

1.29 Any of Method 1 or 1.1-1.28, wherein the method comprises admixing 0.1 to 10 v/v % of the conductive polymer and primary dopant, 0.1 to 5 v/v % of the structural component, and 1 to 20 v/v % of the secondary dopant.

1.30 Any of Method 1 or 1.1-1.29, wherein the method comprises admixing 0.7 v/v % of the conductive polymer and primary dopant, 0.7 v/v % of the structural component, and 12.5 v/v % of the secondary dopant, e.g., 0.7 v/v % PEDOT:PSS, 0.7 v/v % cellulose, and 12.5 v/v % glycerol.

1.31 Any of Method 1 or 1.1-1.30, wherein the method comprises pre-heating (e.g., at a temperature for which the ingredient remains structurally efficacious) one or more of the ingredients prior to admixture, e.g., wherein the method comprises pre-heating the secondary dopant (e.g., glycerol) prior to admixture.

1.32 Method 1.31, wherein the method comprises pre-heating to 45 to 50° C., e.g., 45° C.

1.33 Method 1.31 or 1.32, wherein the method comprises pre-heating for 20-30 minutes.

1.34 Any of Method 1 or 1.1-1.33, wherein the admixture is cast.

1.35 Any of Method 1 or 1.1-1.34, wherein the method comprises wet blending in a solvent, e.g., water.

1.36 Any of Method 1 or 1.1-1.35, wherein the method comprises dry blending, e.g., with a mortar and pestle or other conventional mixing equipment.

1.37 Any of Method 1 or 1.1-1.36, wherein the method comprises heating the admixture, e.g., to a temperature sufficiently high to remove or to decrease the concentration of at least one ingredient but which does not deteriorate the composite.

1.38 Any of Method 1 or 1.1-1.37, wherein the method comprises heating the admixture to form a gel.

1.39 Method 1.37 or 1.38, wherein the method comprises heating the admixture to 45 to 50° C.

1.40 Any of Method 1 or 1.1-1.39, wherein the method comprises preparing a composite or energy storage device as described in any of the examples below.

It should be understood that the exemplary embodiments described herein should be considered in a descriptive sense only and not for purposes of limitation. Other features and advantages of the invention are apparent from the following description of the embodiments thereof, and from the claims. Descriptions of features or aspects within each embodiment should typically be considered as available for other similar features or aspects in other embodiments. It will be understood by those of ordinary skill in the art that various changes in form and details may be made therein without departing from the spirit and scope of the present embodiments, and from the claims.

EXAMPLES

The following examples are offered to illustrate, but not to limit, the claimed invention in any manner.

Example 1

Preparation of an Energy Storage Composite

This example illustrates the development of an energy storage composite.

To create composites, all the components with concentration expressed in volume-per volume percent (v/v %) as indicated in the table below are added sequentially in a mixing tube. Briefly, after addition of glycerol (MP Biochemicals) to water, the mixture is incubated at 45-50° C. for 20-30 min. Afterwards, cellulose (Sigma-Aldrich) prepared by dissolving the powder in water is added as a solution (10% by weight solution of cellulose, 0.416 ml of the cellulose solution is added to the mixture). Lastly, PEDOT:PSS (Sigma-Aldrich, 1.0-1.3% by weight) is added as an aqueous solution. The slurry is mixed thoroughly and is cast in 3.5 cm diameter plates as a final volume of 6 mL. In addition, in order to trigger and accelerate the solidification of the slurry, a step of baking the composite is included. Plates are incubated at 45-50° C. until the slurry becomes a solid composite with the consistency of a gel (3-6 days). The composite is then observed for appearance and tested for capacitance and resistance. All measurements are carried out using an LCR meter where one end is placed on one plate and the other on the opposite plate to measure capacitance and performed in triplicate on two individual samples. Control measurements include the testing of standard capacitors.

Two methods are compared side by side. One method allows for the heating at 45° C. of water and glycerol for 20-30 min prior to addition of cellulose and PEDOT:PSS whereas another method does not include the pre-heating step. As reported below, a pre-heating step shows improvement of the composite performance leading to an increase of capacitance from 370.7±14.2 nF to 1021±61.9 nF.

TABLE 1

Comparison of capacitance (nF) and resistance (Ohms) average values obtained on day 7 after 6 mL slurry casting in 3.5 cm diameter plates of a composite prepared with PEDOT:PSS (0.7 v/v %), Glycerol (12.5 v/v %), and Cellulose (0.7 v/v %) following two different methods. Each data point represents averages of data for two individual samples measured in triplicate.

| Protocol | Capacitance (nF) | | | Resistance (Ohms) | | |
| --- | --- | --- | --- | --- | --- | --- |
| | Average | SD | % CV | Average | SD | % CV |
| Pre-heating step | 1021 | 61.9 | 6.1 | 109.0 | 10.4 | 9.5 |
| No pre-heating step | 370.7 | 14.2 | 3.8 | 123.9 | 10.2 | 8.2 |

% CV: Coefficient of Variation;
nF: nanoFarad;
SD: Standard Deviation.

Example 2

Comparison of Composite Performance Using Cellulose of Various Fiber Sizes

This example illustrates performances of composites prepared with cellulose of various fiber sizes.

Various forms of structural components are tested including various sizes of cellulose fibers (5-10 microns, 20 microns, 50 microns) and paper considering that size may influence their structural properties. In addition, corn starch that is a glucose polymer similar to cellulose is also tested.

To create composites, all the components with concentration expressed in volume per volume percent (v/v %) as indicated in the table below are added sequentially in a mixing tube. Briefly, after addition of glycerol (MP Biochemicals) to water, the mixture is incubated at 45-50° C. for 20-30 min. Afterwards, solutions of cellulose (5-10 micron, 20 micron, 50 micron, Sigma Aldrich) or corn starch (ACH) prepared by dissolving the powder in water are added. Lastly, PEDOT:PSS aqueous solution (Sigma-Aldrich, 1.0-1.3% by weight) is added. The slurry is mixed thoroughly and is cast in 3.5 cm diameter plates as a final volume of 6 mL. Plates are incubated at 45-50° C. until the slurry becomes a solid composite with the consistency of a gel (3-6 days). Composites are then observed for appearance and tested for capacitance and resistance. All measurements are carried out using an LCR meter and performed in triplicate on two individual samples. Control measurements include the testing of standard capacitors.

Typical results obtained with composites prepared with PEDOT:PSS, glycerol, and various fiber sizes of celluloses are reported in the table below. As the data indicate, it appears that cellulose with particle size of 5-10 microns is slightly superior to larger particle size in terms of performance. The appearance of the various composites remains comparable for all forms of celluloses.

TABLE 2

Capacitance (nF) and resistance (Ohms) average values obtained on day 7 after casting of 6 mL slurry for composites prepared with PEDOT:PSS (0.7 v/v %), Glycerol (12.5 v/v %), and 3 forms of cellulose (0.18; 0.35; and 0.7 v/v %), or corn starch (0.18; 0.35; and 0.7 v/v %), or layered on thick (1 mm cellulose) and on thin (printing) paper. Each data point represents averages of values obtained for two individual samples measured in triplicate.

| Composite Description | Capacitance (nF) | | | Resistance (Ohms) | | |
|---|---|---|---|---|---|---|
| | Average | SD | % CV | Average | SD | % CV |
| PEDOT 0.7 v\| GLY 12.5 v\| CEL-1 0.7 v | 1318 | 42.72 | 3.2 | 103.4 | 4.87 | 4.7 |
| PEDOT 0.7 v\| GLY 12.5 v\| CEL-1 0.35 v | 999.6 | 20.38 | 2.0 | 263.9 | 31.16 | 11.8 |
| PEDOT 0.7 v\| GLY 12.5 v\| CEL-1 0.18 v | 887.8 | 26.11 | 2.9 | 310.2 | 0.97 | 0.3 |
| PEDOT 0.7 v\| GLY 12.5 v\| CEL-2 0.7 v | 1595 | 96.49 | 6.1 | 63.67 | 6.08 | 9.5 |
| PEDOT 0.7 v\| GLY 12.5 v\| CEL-2 0.35 v | 1171 | 20.67 | 1.8 | 193.9 | 15.98 | 8.2 |
| PEDOT 0.7 v\| GLY 12.5 v\| CEL-2 0.18 v | 1069 | 8.78 | 0.8 | 245.8 | 3.89 | 1.6 |
| PEDOT 0.7 v\| GLY 12.5 v\| CEL-3 0.7 v | 698.6 | 4.76 | 0.7 | 596.4 | 57.53 | 9.6 |
| PEDOT 0.7 v\| GLY 12.5 v\| CEL-3 0.35 v | 388.0 | 6.71 | 1.7 | 808.8 | 19.87 | 2.5 |
| PEDOT 0.7 v\| GLY 12.5 v\| CEL-3 0.18 v | 161.4 | 5.94 | 3.7 | 849.7 | 59.73 | 7.0 |
| PEDOT 0.7 v\| GLY 12.5 v\| Corn 0.7 v | 935.0 | 23.39 | 2.5 | 371.5 | 15.06 | 4.1 |
| PEDOT 0.7 v\| GLY 12.5 v\| Corn 0.35 v | 198.4 | 7.53 | 3.8 | 548.6 | 8.82 | 1.6 |
| PEDOT 0.7 v\| GLY 12.5 v\| Corn 0.18 v | 212.4 | 0.74 | 0.3 | 548.2 | 4.41 | 0.8 |
| PEDOT 0.7 v\| GLY 12.5 v\| Thick paper | 624.8 | 2.90 | 0.5 | 316.6 | 14.26 | 4.5 |
| PEDOT 0.7 v\| GLY 12.5 v\| Thin paper | 197.4 | 0.00 | 0.0 | 978.7 | 61.80 | 6.3 |
| PEDOT 0.7 v\| GLY 12.5 v | 687.0 | 30.3 | 4.4 | 382.6 | 23.1 | 6.0 |
| PEDOT 0.7 v | 1.577 | 0.31 | 19.8 | 2862 | 418.4 | 14.6 |

CEL: Cellulose;
CEL-1, 20 micron fiber size;
CEL-2, 5-10 micron fiber size;
CEL-3, 50 micron fiber size;
Corn: Corn starch;
GLY: Glycerol;
PEDOT: PEDOT:PSS;
Thick paper: cellulose filter;
Thin paper: printing paper;
% CV: Coefficient of Variation;
nF: nanoFarad;
SD: Standard Deviation;
v: v/v %, volume/volume percent solution.

Example 3

Comparison of Composite Performance Using Various Secondary Dopants

This example illustrates performances of composites prepared with various secondary dopants.

To create composites, all the components with concentration expressed in volume per volume percent (v/v %) are added sequentially in a mixing tube. Briefly, after addition of glycerol (MP Biochemicals) and/or other secondary dopants such as PEG200, PEG 400, the mixture is incubated at 45-50° C. for 20-30 min. Afterwards, a solution of cellulose (Sigma Aldrich) prepared by dissolving the powder in water is added (10% by weight solution of cellulose, 0.416 ml of the cellulose solution is added to the mixture). Lastly, PEDOT:PSS aqueous solution (Sigma-Aldrich, 1.0-1.3% by weight) is added. The slurry is mixed thoroughly and is cast in 3.5 cm diameter plates as a final volume of 6 mL. Plates are incubated at 45-50° C. until the slurry becomes a solid composite with the consistency of a gel (3-6 days). The composite is then observed for appearance and tested in a panel of assays. All measurements obtained with an LCR meter are performed in triplicate on two individual samples. Control measurements include the testing of standard capacitors.

Composites are prepared containing PEG200 or PEG400 at concentration of 1 v/v % and 5 v/v %. The addition of PEG200 or PEG400 to PEDOT:PSS and cellulose does not have as much of a dramatic impact as the addition of glycerol. Addition of 1 and 5 v/v % PEG200 to PEDOT:PSS (0.7 v/v %) and cellulose (0.7 v/v %) increases the capacitance from 17.7±7.4 nF to 81.0±6.2 nF and 121.5±19.9 nF respectively (average±standard deviation). Addition of 1 and 5 v/v % PEG 400 to PEDOT:PSS (0.7 v/v %) and cellulose (0.7 v/v %) increases the capacitance from 17.7±7.4 nF to 84.9±4.9 nF and 84.1±2.8 nF respectively. It is worth noting that the addition of polyethylene glycol to a composite with optimal concentration of PEDOT:PSS (0.7 v/v %), glycerol (12.5 v/v %), and cellulose (0.7 v/v %) has a negative impact on the overall performance of the composite. The capacitance is decreased from 1051±116.9 nF for glycerol-based composite to 831.6±29.9 nF with PEG200 (1 v/v %) and 152.9±13.2 nF with PEG400 (1 v/v %). In addition, PEG200 and PEG400 trigger the formation of cracks that could be explained by an evaporation rate faster than for a composite containing PEDOT:PSS, cellulose and glycerol.

DMSO is also tested as a potential secondary dopant. DMSO does not appear to improve the capacitance as dramatically as glycerol. Also, in composites prepared with DMSO, there is appearance of a liquid layer at the top of the solidified slurry, about 2-3 days after slurry casting. Interestingly, the pH of a PEDOT:PSS/cellulose composite remains at pH 1-2 when glycerol is added but increased to ~pH 5 when DMSO is added. This increase in pH values favors repulsive negative charges between ingredients and even a dissociation of PEDOT and PSS creating aggregates of PEDOT as PEDOT is in a suspension state only when associated with PSS. This could explain why in composites containing DMSO, there is a separation of phases and appearance of a liquid at the surface of the composite, which in turn would explain the low performance.

Example 4

Comparison of Composite Performance Using Various Ratios of Glycerol and Cellulose This example illustrates performances of composites prepared with various ratios of glycerol and cellulose.

Composites are prepared with PEDOT:PSS alone or in combination with various concentrations of either glycerol or cellulose. Briefly, the reagent grade water and glycerol are mixed and heated up at 45-50° C. for 20-30 min. The cellulose solution and PEDOT:PSS are then added and mixed thoroughly before casting the 6 mL slurry in 3.5 cm diameter plates. Plates are incubated at 45-50° C. until the slurry becomes a solid composite with the consistency of a gel (3-6 days). The composite is then observed for appearance and tested for capacitance and resistance. All measurements are carried out using an LCR meter and performed in triplicate on two individual samples. Control measurements include the testing of standard capacitors.

Typical results obtained with composites prepared with PEDOT:PSS modified with various glycerol and cellulose concentrations are reported in the table below. The capacitance of PEDOT:PSS increases from the pF range to the nF range and the resistance decreases from M-ohms to several hundred ohms for a mixture containing all three components. The data also indicate that a combination of all three components is required to obtain a highly performing composite as measured by capacitance, resistance, and appearance. The highest capacitance and the lowest resistance are obtained for a composite prepared with PEDOT:PSS (0.7 v/v %), glycerol (12.5 v/v %) and cellulose (0.7 v/v %). Composites including PEDOT:PSS, glycerol, and cellulose, exhibit higher capacitance values and lower resistance values than composites prepared with PEDOT:PSS alone, PEDOT:PSS and cellulose, and PEDOT:PSS and glycerol. With increasing glycerol concentration, the capacitance reaches high values. However, concentration of glycerol such as 20 v/v % does not further improve either capacitance or resistance. In addition, the appearance of the different composites varies depending on its composition. The composite including all three components appears as a homogenous solid shiny blue gel whereas a composite with PEDOT:PSS only gives rise to a very thin film with multiple cracks sticking to the bottom of the plate. The addition of cellulose to PEDOT:PSS generates a dried rolled-up paper-like film creating significant measurement variability whereas a composite prepared with glycerol and PEDOT:PSS only generates a solid gel with few cracks. In addition, the thickness of composites prepared with cellulose concentrations of 5 or 10 v/v % is greater than the other composites with the appearance of moist papier mache with cracks, making the composite properties not optimal for this application.

The addition of cellulose is meant to address the structural issue while no effect on the capacitance is expected. However, surprisingly, the data shows a significant increase of average capacitance values when the composite includes all three components vs. each of the two component combinations (i.e. PEDOT+Glycerol+Cellulose vs. PEDOT+Cellulose or vs. PEDOT+Glycerol).

TABLE 3

Capacitance (nF) and resistance (Ohms) average values obtained on day 7 after 6 mL slurry casting in 3.5 cm diameter plates of various composites prepared with PEDOT:PSS (PEDOT), Glycerol (GLY), and Cellulose fiber (CEL). Each data point represents averages of data for 2 individual samples measured in triplicate.

| Composite Description: | Capacitance (nF) | | | Resistance (Ohms) | | | Observ. |
|---|---|---|---|---|---|---|---|
| | Avg. | SD | % CV | Avg. | SD | % CV | |
| PEDOT 0.7 v |CEL-1 0.7 v | GLY 8.6 v | 883.7 | 24.80 | 2.81 | 162.1 | 17.91 | 11.1 | Gel |
| PEDOT 0.7 v |CEL-1 0.7 v | GLY 12.5 v | 1034.4 | 37.92 | 3.67 | 163.9 | 18.17 | 11.1 | Gel |
| PEDOT 0.7 v |CEL-1 0.7 v | GLY 20.0 v | 779.9 | 15.06 | 1.93 | 392.1 | 21.47 | 5.48 | Gel |
| PEDOT 0.7 v | GLY 8.6 v | 480.6 | 41.55 | 8.65 | 156.0 | 24.16 | 15.5 | Gel with few cracks |
| PEDOT 0.7 v | GLY 12.5 v | 760.4 | 36.25 | 4.77 | 151.0 | 17.91 | 11.9 | Gel with few cracks |
| PEDOT 0.7 v | GLY 20.0 v | 620.5 | 14.35 | 2.31 | 414.6 | 0.684 | 0.16 | Gel with few cracks |
| PEDOT 0.7 v| GLY 8.6 v | CEL-1 0.7 v | 927.1 | 19.8 | 2.13 | 152.9 | 12.0 | 7.85 | Gel |
| PEDOT 0.7 v| GLY 8.6 v | CEL-1 0.3 v | 712.2 | 1.51 | 0.21 | 336.6 | 51.2 | 15.2 | Gel |
| PEDOT 0.7 v| GLY 8.6 v | CEL-1 0.1 v | 616.0 | 6.8 | 1.11 | 424.8 | 2.83 | 0.67 | Gel |
| PEDOT 0.7 v| GLY 8.6 v | CEL-1 5.0 v | 39.0 | 0.4 | 1.11 | 2807 | 124.0 | 4.42 | Thick, cracked, gel |
| PEDOT 0.7 v| GLY 8.6 v | CEL-1 10 v | 1.04 | 0.17 | 16.4 | 964.6 | 139.7 | 14.5 | Thick, cracked, gel |
| PEDOT 0.7 v | CEL-1 10 v | 0.26 | 0.12 | 46.2 | 2942 | 543.3 | 18.5 | Rolled-up dry film |
| PEDOT 0.7 v | CEL-1 5.0 v | 0.74 | 0.13 | 17.8 | 2633 | 317.7 | 12.1 | Rolled-up dry film |
| PEDOT 0.7 v | CEL-1 0.7 v | 7.735 | 0.65 | 8.37 | 693.1 | 27.51 | 3.97 | Rolled-up dry film |
| PEDOT 0.7 v | 1.873 | 0.60 | 32.3 | 978.6 | 45.47 | 4.65 | Thin film with multiple cracks |

% CV: Coefficient of Variation;
nF: nanoFarad;
SD: Standard Deviation;
V: V/V %, volume/volume percent solution.

Example 5

Testing of Composite as a Device

This example illustrates an analysis of a composite in a circuit as a device.

Circuit Setting:

The composite is connected to an electrical circuit to test voltage across the composite. The electrical circuit is built in such a way that a 9V battery power source on charge mode feeds electrons through a capacitor of 1 mF and through the composite (1.682 µF) placed in parallel so that the voltage remains equal for both of them. The electrons can then flow through two resistors of 500Ω (light bulb) and 15 kΩ placed in parallel so that the voltage remains equal for both of them. So, at T=Time=0, both capacitors act as a wire so the amperage is high. As time goes on, the capacitors gain voltage and the amperage decreases. At T=∞, the capacitors are blocked like cut wires, the amperage decreases to zero, and the voltage accumulates on each capacitor to reach 9V. When the switch is flipped, the capacitor discharges and the two resistors subsequently gain voltage, the capacitors lose their voltage, and the light bulb sparks.

Circuit Calculation:

The following results are calculated from the electrical circuit.

Capacitance in parallel is given by: $C_{total}=C_1+C_2$. So, the total capacitance of the capacitors in parallel in this given circuit is equal to $C_{total}=1.682$ microF+1000.000 microF, so $C_{total}=1001.682$ microF.

Since the capacitors are in parallel, the voltages on each will be the same, 9 Volts in this case as a 9V battery is being used: Capacitance×Voltage=Charge (present on Capacitor). So for 1000 microFarad Capacitor=(9)×(1000×10^-6)=0.009 Coulombs and for 1.682 microFarad Capacitor=(9)×(1.682×10^-6)=0.000015138 Coulombs.

The total resistance in circuit in a parallel circuit is given by: $1/R_{total}=1/R_1+1/R_2\ldots$. In this case, 1/R total=1/500+1/15000=483.8709 Ohms. Thus, when time is about zero seconds the total amperage will be about 9/483.8709=0.0186 Amps, because Amps=Volts/Ohms.

The Power of each circuit in watts (or One Joule per Second)=(Voltage×Current=Power) is calculated as follows: for the 500 Ohm resistor=9 volts/500 ohms=0.018 Amps thus, 0.018 Amps×9 Volts=0.162 Watts; and for the 15000 Ohm resistor=9 Volts/15000 ohms=0.0006 Amps thus, 0.0006 Amps×9 Volts=0.00054 Watts.

Determination of the Dielectric Constant:

The Dielectric Constant (k) is a quantity measuring the ability of a substance to store electrical energy in an electric field. Every material has its own dielectric constant κ. The larger the dielectric constant, the more charge can be stored.

In this example, the capacitance of optimal mixture dielectric capacitor is equal to 1.682 microF and the capacitance of Air dielectric capacitor equal 0.0893 microF. Consequently, the experimentally calculated K value of the PEDOT-Mixture generated in this experiment is equal to 1.682 microF/.0893 microF=18.835. For reference, the value K for cellulose, glycerol, and PEDOT:PSS is 4, 45, and 8 to 12, respectively.

REFERENCES

Elschner A., Kirchmeyer S., Lovenich W., Merker U., Reuter K. PEDOT: Principles and Applications of an Intrinsically Conductive Polymer 1st Edition. CRC Press (2010).

Zeng H., Zhu X., Liang Y., and Guo X. Interfacial Layer Engineering for Performance Enhancement in Polymer Solar Cells. MDPI. February (2017)

Hu, L., J. W. Choi, Y. Yang, S. Jeong, F. La Mantia, L.-F. Cui, and Y. Cui. Highly Conductive Paper for Energy-storage Devices. Proceedings of the National Academy of Sciences. 106.51 (2009): 21490-1494.

Hukur, M. f, R. Ithnin, and M. f. z. Kadir. Electrical Characterization of Corn Starch-LiOAc Electrolytes and Application in Electrochemical Double Layer Capacitor. Electrochimica Acta 136 (2014): 204-16.

Malti A., Edberg J., Granberg H., Ullah Khan Z., Andreasen J. W., Liu X., Zhao D., Zhang H., Yao Y., Brill J. W., Engquist I., Fahlman M., Wågberg L., Crispin X., and Berggren M. Conducting Polymers: An Organic Mixed Ion-Electron Conductor for Power Electronics (Adv. Sci. 2/2016). Advanced Science 3.2 (2016).

Desalegn Alemu M., Wang P. C., and Chu C. W. Effect of Molecular Weight of Additives on the Conductivity of PEDOT:PSS and Efficiency for ITO-free Organic Solar Cells. Journal of Materials Chemistry A 1.34 (2013): 9907.

Dimitar V., Liu J., Kumar V., Xu C., Toivakka M., and Saarinen J. J. Conductivity of PEDOT:PSS on Spin-Coated and Drop Cast Nanofibrillar Cellulose Thin Films. Nanoscale Research Letters 10.1 (2015).

Irimia-Vladu M., Glowacki E. D., Voss G., Bauer S., and Sariciftci N. S. Green and Biodegradable Electronics. Materials Today 15.7-8 (2012): 340-46

Mostafalu P., and Sonkusale S., Paper based super capacitor using micro and nano particle deposition for paper based diagnostics. IEEE Sensors, (2013): 1.

Riess, I. Polymeric Mixed Ionic Electronic Conductors. Solid State Ionics 136-137.1-2 (2000): 1119-130.

Rivnay J., Inal S., Collins B. A., Sessolo M., Stravrinidou E., Strakosas X., Tassone C., Delongchamp D. M., and Malliaras G. G. Structural control of mixed ionic and electronic transport in conducting polymers. Nature communications 7 (2016)

Wang, Tiejun, Yingqun Qi, Jingkun Xu, Xiujie Hu, and Ping Chen. Effects of Poly(ethylene Glycol) on Electrical Conductivity of Poly(3,4-ethylenedioxythiophene)poly(styrenesulfonic Acid) Film. Applied Surface Science 250.1-4 (2005): 188-94.

Wei, Qingshuo, Masakazu Mukaida, Kazuhiro Kirihara, Yasuhisa Naitoh, and Takao Ishida. Recent Progress on PEDOT-Based Thermoelectric Materials. Materials 8.2 (2015): 732-50.

Zang, Jianfeng, Changyong Cao, Yaying Feng, Jie Liu, and Xuanhe Zhao. Stretchable and High-Performance Supercapacitors with Crumpled Graphene Papers. Scientific Reports 4 (2014): 6492.

What is claimed is:

1. A composite, wherein the composite comprises:
   a. a conductive material, wherein the conductive material comprises a conductive polymer doped with a primary dopant;
   b. a secondary dopant; and
   c. a structural component,
wherein the conductive material, secondary dopant, and structural component form a gel, wherein the structural component comprises fibers and is a glucose polymer, and wherein the composite is for energy storage.

2. The composite of claim 1, wherein the conductive polymer comprises one or more of O, N, and S.

3. The composite of claim 1, wherein the conductive polymer is one or more of polypyrrole (PPy), polyaniline (PANT), poly(3,4-ethylenedioxythiophene) (PEDT, PEDOT), polythiophene (PTh), polythiophene-vinylene (PTh-V), poly(2,5-thienylenevinylene) (PTV), poly(3-alkylthiophene) (PAT, P3AT), poly(p-phenylene) (PPP), poly-p-phenylene-sulphide (PPS), poly(p-phenylene vinylene) (PPV), polyacetylene (PAc), poly(isothianaphthene) (PITH), poly(α-naphthylamine) (PNA), polyazulene (PAz), polyfuran (PFu), polyisoprene (PIP), polybutadiene (PBD), poly (3-octylthiophene-co-3-methylthiophene) (POTMT), and poly(p-phenylene-terephthalamide) (PPTA).

4. The composite of claim 1, wherein the conductive polymer is cationic.

5. The composite of claim 4, wherein the conductive polymer is a polythiophene.

6. The composite of claim 5, wherein the conductive polymer is poly(3,4-ethylenedioxythiophene).

7. The composite of claim 6, wherein the conductive polymer doped with the primary dopant is poly(3,4-ethylenedioxythiophene)-poly(styrenesulfonate) (PEDOT:PSS).

8. The composite of claim 7, wherein the structural component is cellulose.

9. The composite of claim 8, wherein the secondary dopant is glycerol.

10. The composite of claim 9, wherein the composite comprises 1 to 20 v/v % of glycerol.

11. The composite of claim 7, wherein the secondary dopant is glycerol.

12. The composite of claim 1, wherein the primary dopant is polyanionic.

13. The composite of claim 12, wherein the primary dopant is poly(styrenesulfonate).

14. The composite of claim 1, wherein the structural component is cellulose.

15. The composite of claim 14, wherein the structural component is cellulose from cotton.

16. The composite of claim 1, wherein the secondary dopant is a polyol.

17. The composite of claim 16, wherein the secondary dopant is glycerol.

18. An energy storage device, wherein the energy storage device comprises the composite of claim 1.

19. A method of making the composite of claim 1, wherein the method comprises admixing a conductive material comprising a conductive polymer doped with a primary dopant, a secondary dopant, and a structural component to form the composite, wherein the composite is a gel.

20. The method of claim 19, wherein the structural component is a cellulose powder.

21. A capacitor, wherein the capacitor comprises:
    a. a conductive material, wherein the conductive material comprises a conductive polymer doped with a primary dopant;
    b. a secondary dopant; and
    c. a structural component,
wherein the conductive material, secondary dopant, and structural component form a gel, wherein the structural component comprises fibers.

22. The capacitor of claim 21, wherein the conductive polymer is one or more of polypyrrole (PPy), polyaniline (PANT), poly(3,4-ethylenedioxythiophene) (PEDT, PEDOT), polythiophene (PTh), polythiophene-vinylene (PTh-V), poly(2,5-thienylenevinylene) (PTV), poly(3-alkylthiophene) (PAT, P3AT), poly(p-phenylene) (PPP), poly-p-phenylene-sulphide (PPS), poly(p-phenylene vinylene) (PPV), polyacetylene (PAc), poly(isothianaphthene) (PITN), poly(α-naphthylamine) (PNA), polyazulene (PAz), polyfuran (PFu), polyisoprene (PIP), polybutadiene (PBD), poly (3-octylthiophene-co-3-methylthiophene) (POTMT), and poly(p-phenylene-terephthalamide) (PPTA).

23. The capacitor of claim 21, wherein the conductive polymer is cationic, the primary dopant is polyanionic, the secondary dopant is a polyol, and the structural component is a glucose polymer.

24. The capacitor of claim 23, wherein the structural component is cellulose.

25. The capacitor of claim 23, wherein the secondary dopant is glycerol.

26. The capacitor of claim 21, wherein the conductive polymer is poly(3,4-ethylenedioxythiophene), the primary dopant is poly(styrenesulfonate), the secondary dopant is glycerol, and the structural component is cellulose.

27. The capacitor of claim 26, wherein the capacitor comprises 1 to 20 v/v % of glycerol.

* * * * *

UNITED STATES PATENT AND TRADEMARK OFFICE
CERTIFICATE OF CORRECTION

PATENT NO. : 10,614,928 B2
APPLICATION NO. : 15/955594
DATED : April 7, 2020
INVENTOR(S) : Philippe Hansen-Estruch Page 1 of 1

It is certified that error appears in the above-identified patent and that said Letters Patent is hereby corrected as shown below:

In the Claims

Claim 3, Column 21, Line 1:
"(PANT), poly(3,4-ethylenedioxythiophene) (PEDT,"
Should read:
-- (PANI), poly(3,4-ethylenedioxythiophene) (PEDT, --

Claim 3, Column 21, Line 6:
"(PPV), polyacetylene (PAc), poly(isothianaphthene) (PITH),"
Should read:
-- (PPV), polyacetylene (PAc), poly(isothianaphthene) (PITN), --

Claim 22, Column 22, Line 17:
"(PANT), poly(3,4-ethylenedioxythiophene) (PEDT,"
Should read:
-- (PANI), poly(3,4-ethylenedioxythiophene) (PEDT, --

Signed and Sealed this
Seventh Day of July, 2020

Andrei Iancu
*Director of the United States Patent and Trademark Office*